United States Patent [19]

Matsubara et al.

[11] 4,160,147
[45] Jul. 3, 1979

[54] MULTI-SPOT WELDING APPARATUS

[75] Inventors: Soichi Matsubara, Gunma; Ryo Niikawa, Sayama; Morikuni Numata, Omiya, all of Japan

[73] Assignee: Honda Giken Kogyo Kabushiki Kaisha, Tokyo, Japan

[21] Appl. No.: 811,671

[22] Filed: Jun. 29, 1977

[30] Foreign Application Priority Data

Jul. 2, 1976 [JP] Japan .................. 51-77769

[51] Int. Cl.² .............................................. B23K 11/10
[52] U.S. Cl. .......................................... 219/87; 219/80; 219/86.7
[58] Field of Search ................... 219/87, 86.7, 80

[56] References Cited

U.S. PATENT DOCUMENTS

| | | | |
|---|---|---|---|
| 2,286,980 | 6/1942 | Schanz | 219/87 |
| 2,293,535 | 8/1942 | Doll | 219/87 |
| 2,295,925 | 9/1942 | Biederman | 219/87 |
| 2,323,696 | 7/1943 | Weightman | 219/87 |
| 3,205,337 | 9/1965 | Hiemenz | 219/87 |
| 3,448,238 | 6/1969 | Savitz | 219/80 X |

Primary Examiner—Richard R. Kucia
Attorney, Agent, or Firm—Haseltine, Lake & Waters

[57] ABSTRACT

A multi-spot welding arrangement in which a jig table on the front surface of a machine frame has a plurality of welding guns located along the shape or contour of the workpiece to be processed or worked. An electric supply has a plurality of units which are connected to the welding guns through respective electric supply cables. A pressure applying mechanism has a plurality of operation cylinders which are connected to the welding guns through respective flexible wires, and is located on the rear side and the upper side of the machine frame. The machine frame, moreover, has a front frame and a rear frame which are coupled together in a detachable manner. The jig table and the pressure applying mechanism are located on the front frame, and the electric supply is provided on the rear frame.

1 Claim, 3 Drawing Figures

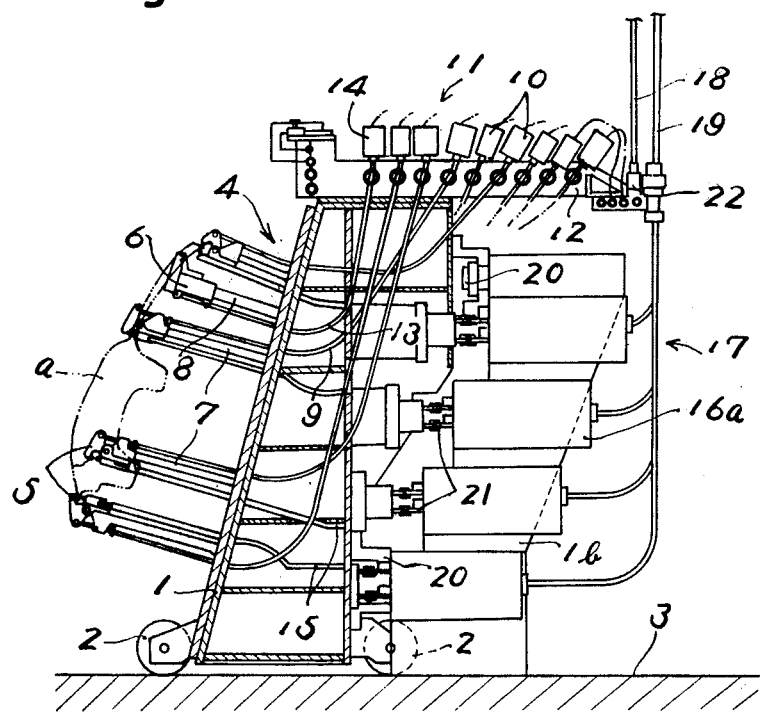
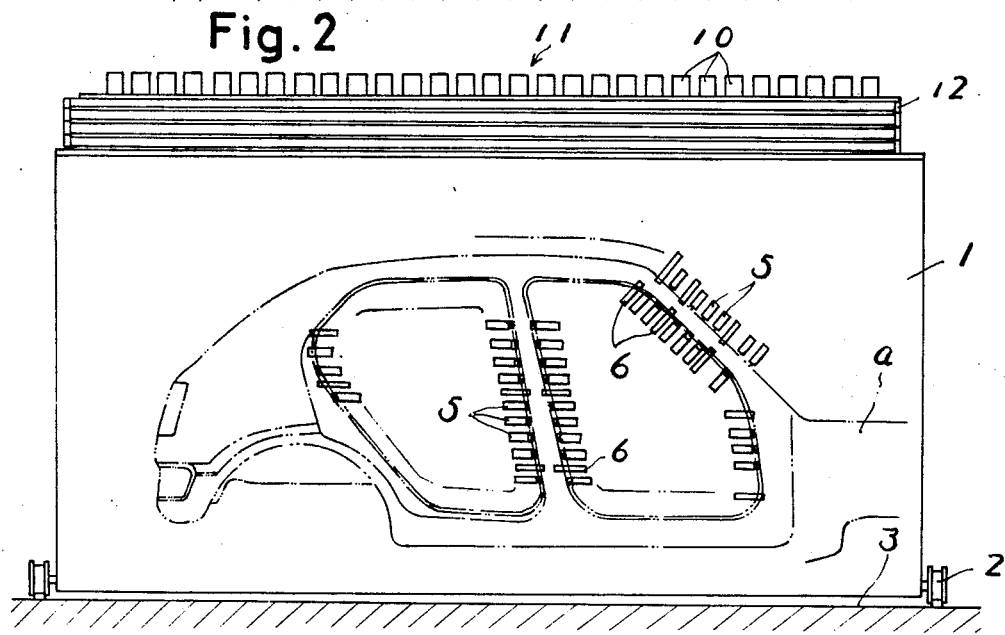

MULTI-SPOT WELDING APPARATUS

BACKGROUND OF THE INVENTION

This invention relates to a multi-spot welding apparatus used, for instance, for manufacturing of a vehicle body frame of a motorcar or the like.

Similar apparatus has been previously proposed for making it possible to locate a large number of welding guns so that they are positioned near each other. The respective guns are connected through respective flexible wires to an operation cylinder provided at a remote position. (Japanese Utility Model Registration Application Sho-49-80595).

Accordingly, it is an object of the present invention to provide apparatus using the above type of welding guns, with a jig table on the front surface of a machine frame and provided thereon with plural welding guns located along the shape or contour of a workpiece to be worked. An electric supply section has plural electric supply units connected to the foregoing welding guns through respective electric supply cables. A pressure applying section has plural operation cylinders connected to the foregoing welding guns through respective flexible wires and disposed on the rear side and the upper side of the machine frame.

Another object of the present invention is to provide an arrangement of the foregoing character which is simple in construction and may be economically fabricated.

A further object of the present invention is to provide an arrangement, as described, which may be readily maintained in service, and which has a substantially long operating life.

SUMMARY OF THE INVENTION

The objects of the present invention are achieved by providing an arrangement in which a machine frame has a jig table on the front surface thereof. The jig table is provided with several welding guns located in position to conform to the contour or shape of the workpiece to be processed. A plurality of electrical supply units within an electric supply arrangement, are connected to the welding guns by means of respective electrical supply cables. A pressure applying mechanism has a plurality of operation cylinders which are connected, through respective flexible tables or wires, to the welding guns. The operation cylinders are located on the rear side and the upper side of the machine frame. The latter, furthermore, has a front frame portion and a rear frame portion which are linked together so that they may be detached. The jig table and the pressure applying mechanism are located on the front frame, whereas the electric supply units are located on the rear frame portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view, partly in section, of one embodiment of the present invention;

FIG. 2 is a front elevational view of the same; and

DESCRIPTION OF THE PREFERRED EMBODIMENTS

Figure 3:
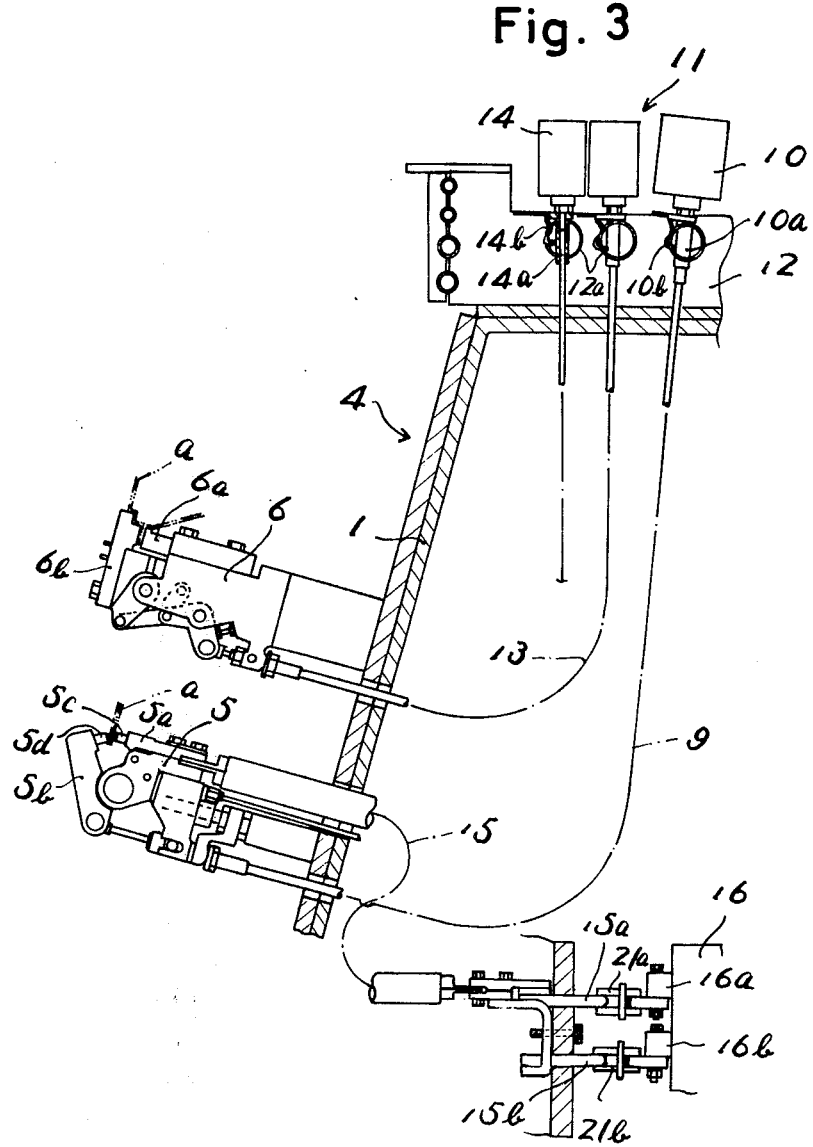
FIG. 3 is an enlarged side view of a part of FIG. 1.

Referring to the drawings, numeral 1 denotes a machine frame placed on a floor surface 3 through wheels 2 provided on the lower portion thereof. Thus, the machine frame 1 is movable forwards and backwards along the floor surface 3.

Referring to the drawings, numeral 4 denotes a jig table which is fixed to the front surface of the machine frame 1 so as to face obliquely upwards, and a large number of welding guns 5 are provided over the table 4 so as to be positioned near each other and to be disposed along the contour shape of a workpiece a such as a vehicle body frame or the like. Additionally, a large numer of clamp members 6 are provided so as to be disposed along the contour shape of the workpiece a. The welding guns 5 and the clamp members 6 are provided over the front surface of the jig table 1 through respective supporting arms 7, 8.

The welding guns 5 are each to be connected to each operation cylinder 10 through each flexible wire 9, and thus a large number of such operation cylinders 10 are provided. These constitute such a single group that they are disposed mutually close to each other, and thus a pressure applying mechanism section 11 is constructed and the same is provided on a mounting base 12 located on the upper surface of the machine frame 1. This arrangement is similarly applied to operation cylinders 14 connected to the respective clamp members 6 through flexible wires 13.

The welding guns 5 are each to be connected also to a electric supply unit 16 through an electric supply cable 15, and thus a large number of such electric supply units 16 are provided. Similarly, these units 16 constitute such a single group that they are mutually located close to one another. As a result, an electric supply mechanism section 17 is constructed, and the same is provided on the rear side of the machine frame 1.

Referring to the drawings, numeral 18 denotes an air supply conduit for communicating between the pressure applying mechanism section 11 and an external compressed air supply source (not illustrated). Numeral 19 denotes an electric supply conduit for connecting between the electric supply mechanism section 17 and an external electric source (not illustrated).

Described in greater detail, in the illustrated embodiment, the machine frame 1 comprises a front frame 1a which has on its lower portion the foregoing wheels 2 for making it movable forwards and backwards along the floor 3, and a rear frame 1b which is positioned on the rear side thereof and is fixed to the floor 3. In an ordinary situation, the two frames 1a, 1b are in abutment with one another and are coupled together by means of couplings 20, each being composed of a bolt and a nut, for instance. With this arrangement, the front frame 1a is provided thereon with the jig table 1 and the pressure applying mechanism section 14, and the rear frame 1b is provided thereon with the electric supply mechanism section 16. As a result, an operation can be expected so that, after completion of the welding operation on the workpiece a, the front frame 1a carrying the workpiece a is separated and removed from the rear frame 1b and is replaced by another front frame 1a prepared for a next new workpiece a.

As shown clearly in FIG. 3, the welding guns 5 each comprise a stationary gun arm 5a and a movable gun arm 5b, and the movable gun arm 5b is connected to the corresponding operation cylinder 10 through the corresponding flexible wire 9 so that the two arms 5a, 5b may be opened and closed by the operation of the cylinder 10. These arms 5a, 5b have at their respective forward ends positive and negative electrodes 5c, 5d facing one another.

Similarly, the clamp members 6 each comprise a stationary arm 6a and a movable arm 6b, and the movable arm 6a is connected to the corresponding operation cylinder 14 through the corresponding flexible wire 13 so that these arms 6a, 6b may be opened and closed by the operation of the cylinder 14.

The electric supply units 16 each comprise at least one welding transformer having on its front surface positive and negative output terminals 16a, 16b. These terminals 16a, 16b are connected to the positive and negative electrodes 5c, 5d of the corresponding welding guns 5 through the corresponding electric supply cable 15. In this case, these cables 15 are each connected at a pair of input terminals 15a, 15b thereof to the foregoing output terminals 16a, 16b through a pair of couplings 21a, 21b. Each have a plug and a socket so as to be separable from one another.

Numeral 22 denotes a coupling for separably connecting the pressure applying mechanism section 11 and the compressed air supply conduit 18.

The foregoing mounting base 12 comprises plural attaching pipes 12a provided in parallel with each other, and the foregoing operation cylinders 10, 14 are attached to these attaching pipes 12a as described below. Thus, as shown clearly on the upper portion of FIG. 3, each of the operation cylinders 10 has a leg pipe portion 10a extending downwards therefrom and a pivotable engaging claw 10b. The same is inserted at its leg portion 10a through any one of the corresponding attaching pipes 12a and is engaged at its engaging claw 1b therewith. This is similarly applicable to each of the operation cylinders 14. Namely, the same 14 has similarly a leg pipe portion 14a extending downwards and a pivotable engaging claw 14b.

In operation of the present invention, after the instant that the workpiece a is placed on the jig table 4 on the front surface of the machine frame 1, the clamp members 6 are operated to close by the operation cylinders 14 through the flexible wires 13, whereby the workpiece a is fixedly clamped and is ready for the next operation. Then, the welding guns 5 are operated to close by the operation cylinders 10 through the flexible wires 9, whereby the workpiece a is subjected to spot-welding at a large number of points. Thus, the electric guns 5 each of which is connected to the electric supply unit 16 through the electric supply cable 15, is operated so that an electric current passes between the opposing electrodes 5c, 5d through the workpiece a. As a result, there is obtained a spot weld. The welding guns 5 are then operated to open and the clamp members 6 are also operated to open, and thereby the welded workpiece a may be removed as a product.

Thus, according to the present invention, the respective welding guns are formed into such arrangement that they are connected to the respective electric supply units and the respective operation cylinders through the electric supply cables and the flexible wires, whereby a large number thereof can be disposed so as to be near each other. Spot welding can be obtained thereby on the workpiece at a large number of points very near each other, and thus the additional welding operation required in the conventional arrangement can be avoided and the working efficiency can be improved. Additionally, the large number of welding guns, the large number of electric supply units and the large number of operation cylinders are located in respectively separated group relationships on the front surface, the rear surface and the upper surface in respect of the machine frame, so that the apparatus can be simply constructed and easily assembled and maintained.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalents of the following claims.

What is claimed is:

1. A multi-spot welding apparatus comprising: a machine frame, said machine frame being formed with a front frame and a rear frame being detachably coupled together; a jig table on the front figure of said machine frame; a plurality of welding guns on said jig table and located along the contour shape of a workpiece to be worked, each of said guns being formed with stationary and movable arms; electric supply means located on said rear frame having a plurality of electric supply units connected to said welding guns through respective electric supply cables; pressure applying means located on said front frame having a plurality of operational cylinders each connected to said respective welding guns through respective flexible wires at said respective moveable arms and located on the rear side and upper side of said machine frame; clamping means actuatable by said operational cylinders after a workpiece is placed on said jig table on the front surface of said machine frame, said operation cylinders actuating said clamping means through said flexible wires, fixedly clamp said workpiece and make ready for a subsequent working operation, said welding guns being operated by said operation cylinders through said flexible wires so that said workpiece has applied thereto a substantially large number of spot-welds at a substantially large number of points on said workpiece, said electric supply guns being connected to said electric units through said supply cables so that an electrical current passes between opposing electrodes through said workpiece to produce a spot-weld, said clamping means being released after said spot-weld is produced for removing said workpiece therefrom.

* * * * *